United States Patent [19]

Wirth et al.

[11] Patent Number: 5,050,693

[45] Date of Patent: Sep. 24, 1991

[54] BALANCE AND PROCESS FOR CALIBRATING AND OPERATING THE BALANCE

[75] Inventors: Johannes Wirth; Mario Gallo, both of Zurich, Switzerland

[73] Assignee: Wirth Gallo Messtechnik AG, Zurich, Switzerland

[21] Appl. No.: 372,371

[22] PCT Filed: Sep. 29, 1988

[86] PCT No.: PCT/CH88/00165

§ 371 Date: May 30, 1989

§ 102(e) Date: Jul. 10, 1989

[87] PCT Pub. No.: WO89/03023

PCT Pub. Date: Apr. 6, 1989

[30] Foreign Application Priority Data

Sep. 30, 1987 [CH] Switzerland .................... 3791/87

[51] Int. Cl.$^5$ .................... G01G 19/00; G01G 19/40; G01G 23/10

[52] U.S. Cl. .................... 177/200; 177/25.14; 177/185

[58] Field of Search .................... 177/25.14, 185, 200

[56] References Cited

U.S. PATENT DOCUMENTS

| | | | |
|---|---|---|---|
| 3,494,437 | 2/1970 | Fathauer | 177/200 |
| 4,212,361 | 7/1980 | Stocker | 177/200 |
| 4,258,811 | 3/1981 | Franzon et al. | 177/200 |
| 4,396,080 | 8/1983 | Dee | 177/185 X |
| 4,624,331 | 11/1986 | Naito | 177/185 |

Primary Examiner—George H. Miller, Jr.
Attorney, Agent, or Firm—Johnson & Gibbs

[57] ABSTRACT

A balance, which is virtually insensitive to angular deviation and to the presence of additional accelerations of the base, has two dynamometers (2, 3) each having a parallel guide (26). The parallel guides are mutually parallel and their degree of freedom coincides with the direction of gravitational acceleration when the balance is horizontal. The dynamometer (2) measures the weight (M) of the object to be weighed, and the dynamometer (3) measures that of a reference mass (8, 22,24). The balance also has a computer (4) which, from the signals emitted by the two dynamometers (2,3), accurately determines the mass of the object to be weighed independently of the angular deviation of the instantaneous total acceleration. During calibration, which can be carried out only by the manufacturer, the dynamometer (3) determines the weight $R_1$, $R_2$ of the reference mass (8, 22, 24) at two different inclinations of the balance and the dynamometer (2) determines the weight ($N_1$, $N_2$) of the empty balance pan (18) and the total weight ($m_1$, $M_2$) using a known standard mass. After appropriate processing, the above-mentioned values and the parameters (s, $S_1$, P, $QR_1$, $N_1$) derived therefrom are stored in the read-only memory (30) of the computer (4). The true mass is then determined from the instantaneous values of the weights (M, R) and the stored quantities.

12 Claims, 4 Drawing Sheets

BALANCE AND PROCESS FOR CALIBRATING AND OPERATING THE BALANCE

The present invention refers to a balance for measurement of true mass, in which the weight of the material being weighed is compared with the weight of a reference mass. The balance must be calibrated only by the manufacturer and without recalibration correctly determines the mass of the material being weighed both in inclined position as well as with gravitational acceleration, g, deviating from the normal value and in the presence of vertical accelerations. Depending on the conditions, both the angular deviation and vertical acceleration can represent large fractions of the gravitational acceleration g.

The combined influence of the three mentioned values henceforth will be called effective local acceleration.

A dynamometer primarily measures the mass of the material being weighed. With given mass, this is dependent on the local gravitational acceleration g: therefore $$G = mg$$

applies.

Additional dynamic forces occur if the dynamometer is mounted on an unsteady, however horizontal, base. The force determined is then:

$$G' = m(g + \ddot{z}),$$

or with inclined position:

$$G'' = m(g + \ddot{z})\cos a$$

An unmodified dynamometer therefore is only used in leveled states on a stable base and with normal value of g, consequently under calibrated conditions for determination of the mass of the material being weighed. When both angular deviation and unsteadiness of the base must be compensated, the mass determination has to be accomplished by comparison with a reference mass. This procedure in the past was accomplished with the old—purely mechanical—Kramer balance, for example of the Beranger type. Modern loading balances and automatic scales in packaging lines are basically calibrated at the use site provided that they are based on a single force measurement. Thus, the local gravitational acceleration is taken into account and random errors in the leveling element are also considered in the calibration. In balances with reference mass—such as those described for example in Swiss Patent 492,961—allowances can be made for angular deviations of more than 5% slope without error. Balances with reference mass, such as those described for example in the cited patent, theoretically are completely insensitive to leveling errors, however in practice are insensitive only up to a designated, small limit angle. Both the weight forces of the working load and that of the reference mass are proportional to the effective local acceleration. However, this applies strictly only when elastic initial loads do not occur as will be shown below in further detail.

In contrast to this, the known measures fail when an on-site recalibration and correct leveling absolutely must be foregone. This is particularly the case when, for example, the packaging lines must be installed on a ship where a frozen fish catch will be packaged during ocean transport or for permanently located industrial packaging lines which create a dynamically unstable environment for the balance. The additional dynamic loads occurring in this case easily can amount to and exceed 10% of the local gravitational acceleration.

The goal to be achieved by the present invention is the creation of a balance which will be calibrated only one time by the manufacturer and without needing to be recalibrated will determine the correct mass of the material being weighed during operation under relatively high, additional dynamic load and with unknown angular deviations.

The achievement of the stated goal has the characteristics cited in patent claim 12 with respect to the process and the characteristics of patent claim 1 with respect to the apparatus. The process according to the invention and the apparatus according to the invention are explained in more detail by means of the attached drawing.

There are shown.

Figure 1:
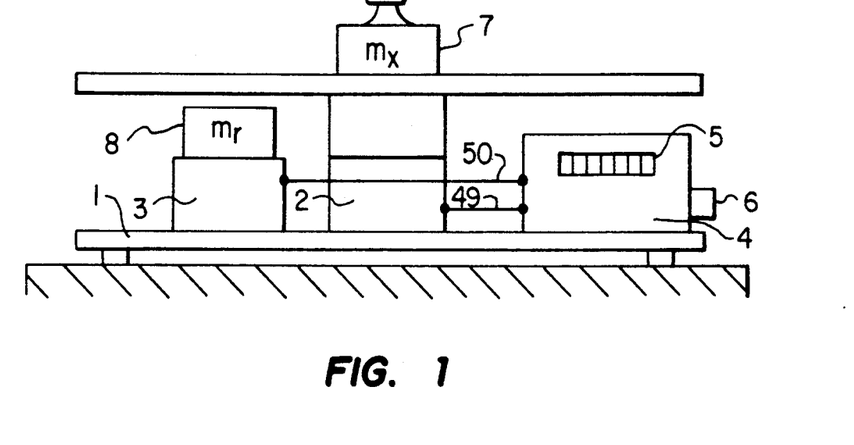
FIG. 1: a schematic representation of the construction of the balance according to the invention.

The schematic representation of FIG. 1 shows two essentially identical dynamometers 2,3 mounted on a common base plate 1 and a computer 4 with display apparatus 5 and a terminal 6 for additional external processing of the weighing data and for receipt of external control commands. The dynamometer 2 measures the force with which the balance is loaded by the material being weighed—represented by a symbolic weight 7 (of mass $m_x$); the dynamometer 3 measures the force which emanates from a constant, permanently mounted reference mass 8 ($m_r$). Both dynamometers are connected to computer 4 as represented schematically by two lines 49, 50.

Before details are given on the representation of the apparatus according to the invention and the process according to the invention, the process corresponding to the state of the art will be depicted briefly.

With the assumption that both dynamometers are ideal apparatuses which means here that mass forces occur only as correspond to the state of the art, $$W_x = m_x(g + \ddot{z})\cos a \tag{1}$$

$$W_r = m_r(g + \ddot{z})\cos a \tag{2}$$

apply for the forces determined and from this the following is calculated by the computer $$\frac{W_x}{W_r} = \frac{m_x}{m_r} \sim m_x \tag{3}$$

The dynamometers 2,3 are constructed in such manner respond only to forces in their characteristic, instantaneous vertical direction (therefore their unique degree of freedom when the forces are introduced through parallel guides); therefore, horizontal accelerations are not taken into consideration. When the balance of FIG. 2 according to the invention stands at an angle, this acts as a change of the local gravitational acceleration g for both dynamometers 2,3; this permits the ratio of $W_x/W_r$ [Equation (3)] to remain unaffected. In turn, horizontal accelerations with inclined balances have an identical influence on both dynamometers 2,3 so that the ratio $W_x/W_4$ remains unchanged. The influence of angular accelerations a has not been studied at this time.

If $\Delta r$, the lateral distance (from center to center) of the two dynamometers 2,3 and the instantaneous center of the torsional acceleration a, is displaced laterally to the dynamometer 2 by the amount r, different vertical accelerations $z_x$ and $a_r$ act on the two masses $m_x$ and $m_r$ (solely from the torsional acceleration a). Then, $$\ddot{z}_x = r\ddot{a}$$

$$\ddot{z}_r = (r + \Delta r)\ddot{a}$$

apply and consequently $$\frac{W_x}{W_r} = \frac{m_x(g + \ddot{r}\ddot{a})}{m_r(g + r(1 \pm \Delta r/r \cdot \ddot{a}))} \approx \frac{m_x}{m_r}\left(1 \mp \frac{\ddot{a}\Delta r}{g + ra}\right) \quad (4)$$

The following applies for estimation of the correction term of equation (4).

With rolling motion of a ship, during which the dynamometer will be operated and will be weighing, $$a \approx 0.2 \text{ sec}^{-1}$$

$$ra \approx 0.1 \text{ g}$$

apply.
In addition, $$r \approx 10 \text{ m}$$

$$\Delta r \approx 0.1 \text{ m}$$

consequently $$\Delta ra \approx 10^{-3} g$$

Therefore, the interference term of equation 4 in parentheses only amounts to approximately 1%.

On the other hand, if a balance stands on a vibrating table in an unsteady, industrial environment, a possibly can become inordinately large. Of course, this is also combined with a relatively large a. For this case, it is essential that, corresponding to the state of the art, digital balances are equipped with a so-called "stability check" to which consecutive weighing results are compared; if a deviation is present which exceeds a preset value, no weighing result is displayed. Erroneous displays are prevented or suppressed with this known stability check.

The process according to the invention now consists essentially of receiving the measurement values of the reference dynamometer 3 and dynamometer 2—both in unloaded states and with precisely known full load—both with leveled and inclined balances. These values are stored in computer 4 (in part after additional processing); in the weighing operation, they then serve for calculating the true values for the weight being determined from its measurement value.

Figure 2:
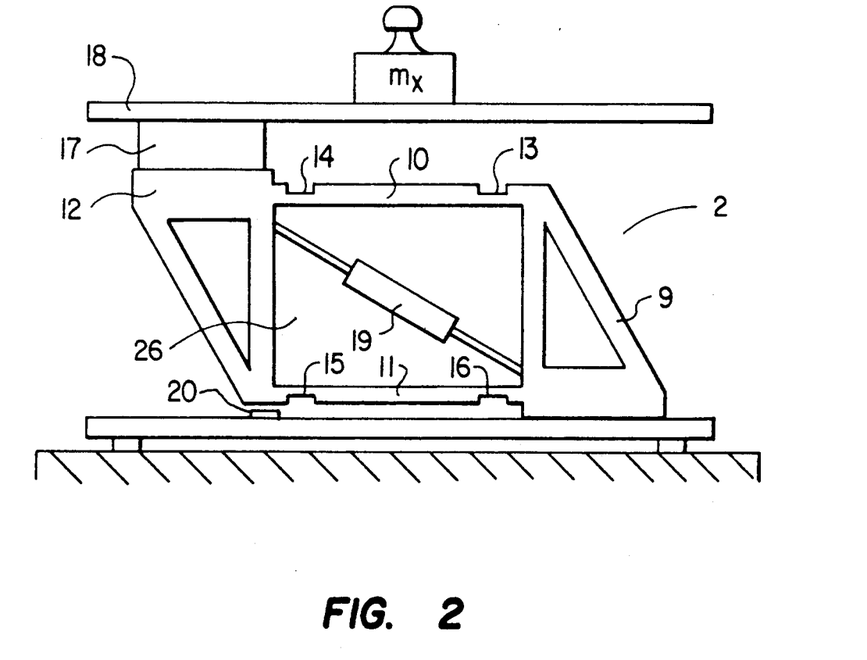
FIG. 2: a side view of a balance according to the invention.

FIG. 2 shows a model example of the balance according to the invention in side view. The balance is seen from the right with reference to FIG. 1. Computer 4 was omitted in FIG. 2, however belongs to the apparatus and process according to according to the invention. Also, dynamometer 3, although an integral component of the invention, has been omitted in FIG. 2 for simplification of the drawing. It is depicted in FIGS. 3, 4, and 5.

The dynamometer 2 depicted in FIG. 2 for measurement of the mass force effected by m is known per se from Swiss Patent Application 03040/87-4: an elastic parallel guide 26, consisting of a frame 9, two essentially parallel plates 10, 11, a load support 12 and four elastic tie joints 13 to 16 support a balance pan 18 through a connecting piece 17 with the effective load symbolized as weight 7. The parallel guide 26 is attached to a loan sensor 19, which converts the pressure force resulting upon loading of the balance pan 18 into an electric—preferably digital—signal. For example the following come into consideration as load sensors: piezoelectric converters, wire strain gauge converters, vibrating wire converters, electromagnetic compensators, Hall effect converters. An adjustable stop 20 which can be locked (depicted in simplified form in the figure) limits the—always small—movement of the load support 12 to below during overload and serves also for shipping protection. A force distribution is effected due to the four tie joints 13 to 16 being subjected to righting moments and the flexibility of the load sensor 19. A part of the force acting on the load support 12 flows directly through parallel guide 26 into the frame 9; the other part is measured by the load sensor 19 and directed further to frame 9. It is contained in the concept of the invention that, with another design of the dynamometers 2,3, a load-proportional tensile force acts on the load sensor 19.

Figure 3:
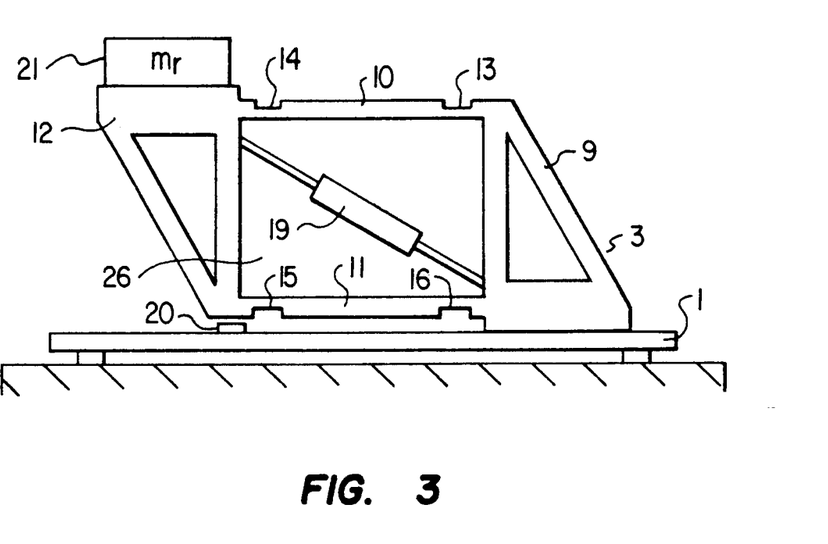
FIG. 3: the model example of FIG. 2 from the opposite side, FIG. 4A,B: a second model example of a part of the balance according to the invention, FIG. 5A,B: a third model example of a part of the balance according to the invention.

FIG. 3 shows a first model example of dynamometer 3 which measures the mass forces originating from reference mass 8 ($m_r$). Its design here is basically the same type as that of dynamometer 2: a parallel guide 26 which consists of identical parts having identical labels. Instead of balance pan 18, it bears a reference weight 21 constructed as a right parallelepiped. The dynamometers 2 and 3 are parallel to each other and mounted in like position and adjacent to each other on base plate 1.

Figure 4A:
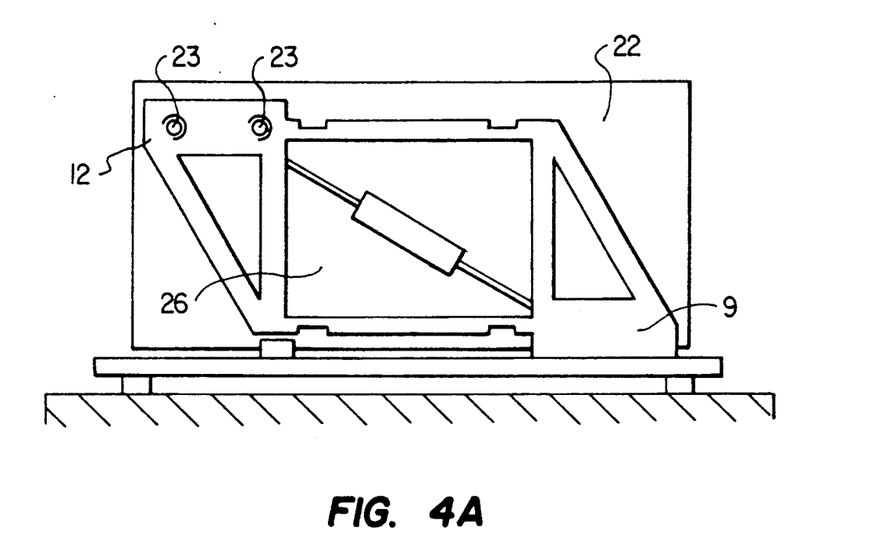
Figure 4B:
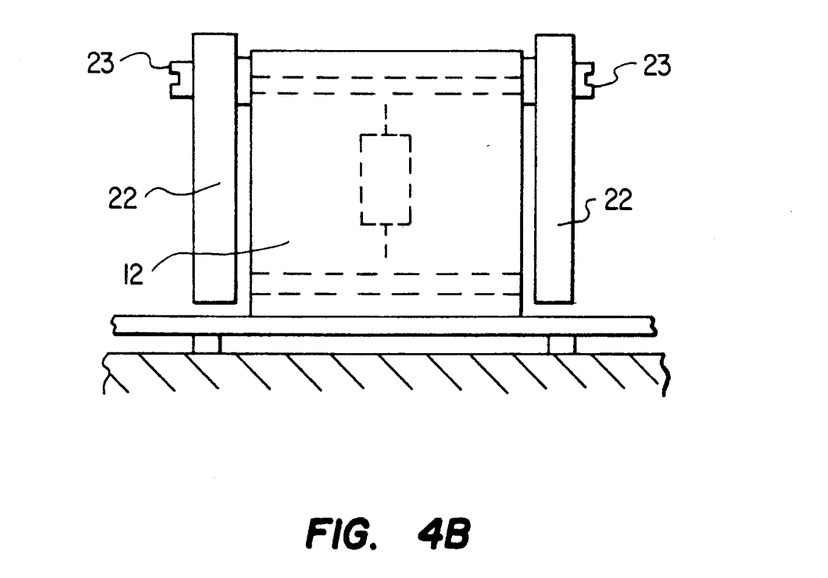
Figure 5A:
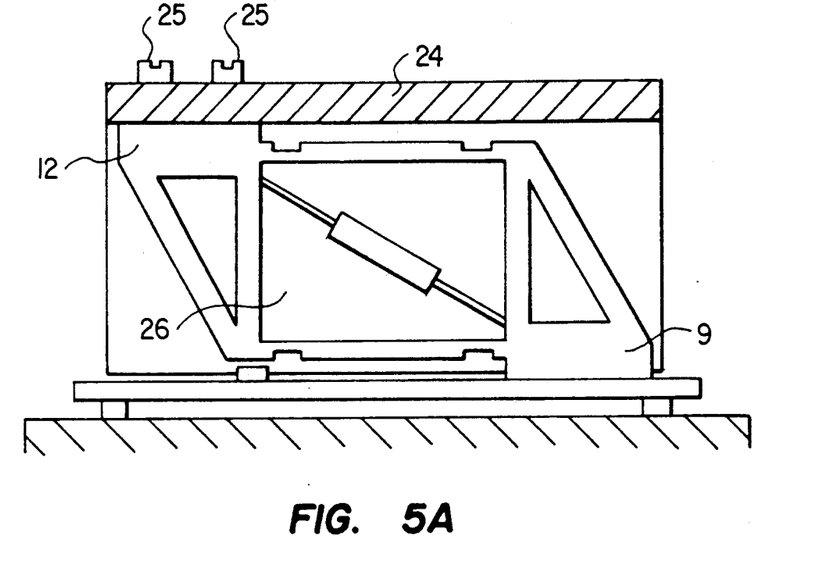
Figure 5B:
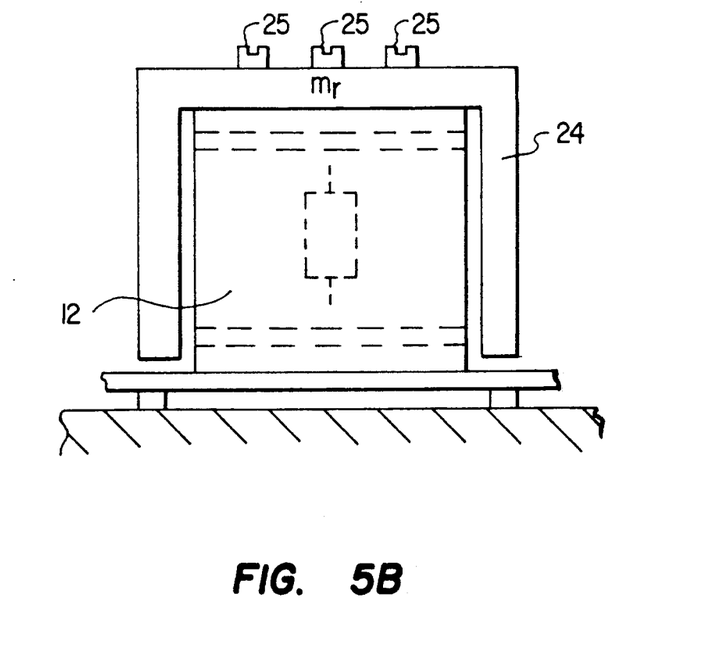

In the model example according to FIG. 4A,B the reference mass is divided between two plates 22 each of which exhibit a mass of m/2. Each plate 22, for example, is mounted on the load support 12 of dynamometer 3 with three screws 23 and, for example, extends down over frame 9. The advantage of this arrangement is the low structural height. FIG. 4A shows the same model example from the side, FIG. 4B is seen from the load support 12.

FIGS. 5A,B are laid out analogous to FIGS. 4A,B. FIG. 5A shows another model example of dynamometer 3 according to the invention. The reference mass 24 here is constructed as a U-profile opening to below, which, for example is attached to load support 12 of dynamometer 3 with 3 screws 25. As in the model example according to FIG. 4A,B, it also extends down over frame 9.

The two dynamometers 2,3 in this case have identical construction and size. The smallest possible elastic reduction is desired for the dynamometer 3 which measures the weight force of the reference mass 8, 22 or 24, since otherwise the reference mass required must be made inappropriately large. The calibrating and weighing process described in detail in the following is independent of the selected type of dynamometer. Basically, it is also usable for any chosen force sensor—even analog sensors. It is irrelevant whether the force sensor used converts the force being measured directly into a digital electric signal or is connected to an AD converter.

Figure 6:
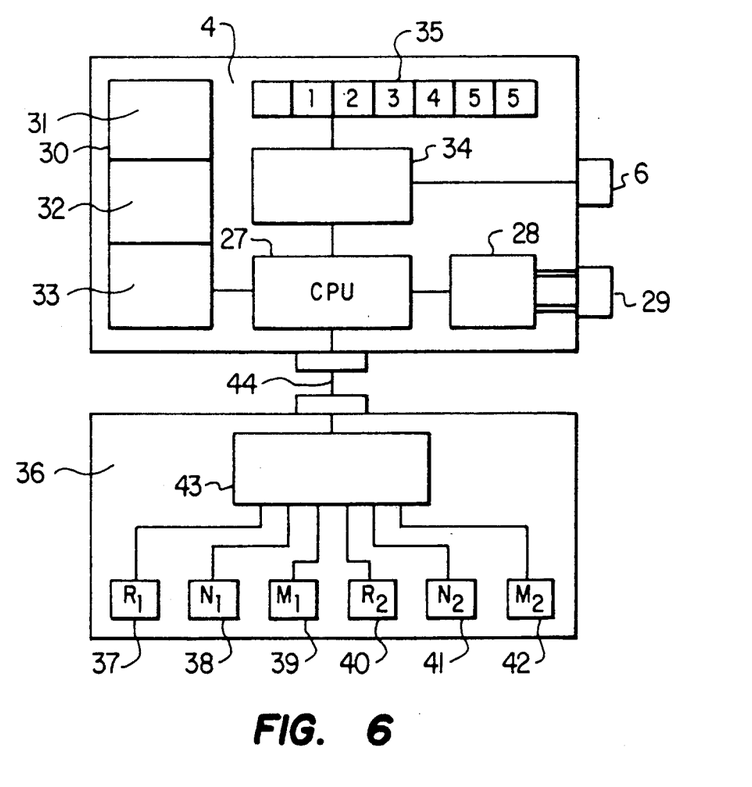
FIG. 6A: a schematic representation of the computer.

FIG. 6 shows a schematic representation of computer 4. It contains a central processing unit 27 labeled as CPU which is connected on the input side with a buffer memory 29. The measurement values of the two dynamometers 2,3 and if necessary the measurement values of temperature measuring sensors are transmitted to this through an input jack 29. In addition, the central processing unit 27 is connected to a read-only memory (PROM or EPROM) 30, which contains the calibration values (s, $S_1$, $N_1$, $R_1$, P, Q) stored permanently in an area 31, the linearization parameters in an area 32 and the parameters of temperature compensation in an area 33. The central calculating register further controls an output unit 34 which formulates the weighing data for numerical representation on a display unit 35 or reports it in binary-coded form through terminal G to external data processing sites, such as, for example label printer, inventory accounting computer, etc. The computer is depicted in FIG. 6 connected to an auxiliary apparatus 36 which is only required during calibration. In the model example according to FIG. 6, this exhibits six keys 37-42. By pressing of the appropriate keys during calibration, the command is given to computer 4 to store the selected value. The contacts of keys 37-42 are connected to a calculating register 43 which is connected to the central processing unit 27 through a line 44.

A model example not depicted uses a desktop computer which is appropriately programmed in place of the auxiliary apparatus 36.

The calibrating and weighing processes are based on the following fundamental principles and equations:

The force determined by load sensor 19 is composed of mass forces $F_m = m(g' + z)$ and elastic forces which are independent of mass and appear as residual stress. The component of the gravitational acceleration is designated by $g'$; this coincides with the particular degree of freedom of the parallel guide. Since both dynamometers 2,3, for example, are elastically reducing, only a certain portion of the mass forces act on the load sensor 19. Further, the fundamental principles include a calculated compensation of the temperature course of the two dynamometers 2,3; for this compensation, the balance according to the invention contains one or more temperature sensors which also are connected to computer 4. A further fundamental principle is that the two dynamometers 2,3 exhibit linear characteristic lines obtained by mechanical means or computer 4 performs this linearization. The manufacturer performs the calibration of the balance with these prerequisites. The calibration is accomplished under controlled conditions with respect to stability, slope, load and temperature.

The ideal relationship for the weight force G at which a mass presses on a chosen dynamometer is $$G = mg_o,$$

where $g_o$ is the instantaneous and local value of the gravitational acceleration. If this chosen dynamometer is at a location affected by a different gravitational acceleration, is also inclined by an angle a and is subject to a vertical acceleration z, it is acted upon by the force G':

$$\begin{aligned} G' &= m(g_o + \Delta g + \ddot{z}) \cos a \\ &= mg_o(1 + h) \end{aligned}$$

From practical considerations, in the present invention the additive term h can be limited to $$h \leq 0.2$$

A dynamometer basically cannot differentiate changes of g, slope influences and vertical accelerations. In principle, calibration can be carried out at two different angles $a_1$ and $a_2$, in which $a_1 = 0$ is the intended goal, however is not achieved reliably. For calibration, four values are calculated for each of the two angles a and are stored in computer 4. These are the following: for $a_1$ $a_2$ values to be stored

| for $a_1$ | $a_2$ | values to be stored |
|---|---|---|
| . | . | |
| . | . | |
| $R_1$ | $R_2$ | the values of reference dynamometer 3 |
| $N_1$ | $N_2$ | zero point values of dynamometer 2 with empty weighing pan 18 |
| $M_1$ | $M_2$ | weight values of dynamometer 2 with full load |
| $S_1$ | $S_2$ | "range" values in which $S_J = M_J - N_J$. |

With linearized and temperature-compensated weighing characteristics, the following relationships are valid:

$$R_1 = B + b'rg_o(1 + h_1)$$

$$R_2 = B + b'rg_o(1 + h_2)$$

$$N_1 = A + a'ng_o(1 + h_1)$$

$$N_2 = A + a'ng_o(1 + h_2)$$

$$M_1 = A + a'(n+s)g(1 + h_1)$$

$$M_2 = A + a'(n+s)g(1 + h_2)$$

and thus $$S_1 = M_1 - N_1 = a'sg_o(1 + h_1)$$

$$S_2 = M_2 - N_2 = a'sg_o(1 + h_2)$$

where
  A = elastic initial load of dynamometer 2
  B = elastic initial load of dynamometer 3
  a' = conversion coefficient of dynamometer 2
  b' = conversion coefficient of dynamometer 3
  n = all masses acting on dynamometer 2 with empty balance pan 18
  r = all masses (essentially reference mass 8), acting on dynamometer 3
  s = mass of the calibration weight producing full load on the balance.

With this, the first part of the calibration process is concluded. The second part consists of the processing of the eight values in computer 4 which produces and then stores the following calculation values:

$$P = \frac{N_2 - N_1}{N_1} \bigg/ \frac{R_2 - R_1}{R_1} \quad (5)$$

$$Q = \frac{S_2 - S_1}{S_1} \bigg/ \frac{R_2 - R_1}{R_1} \quad (6)$$

The following calculation using the stored values of P and Q will show how the correct value m of an unknown mass is assigned mathematically from the value M determined by dynamometer 2.

Since the balance basically cannot differentiate between angular deviation and smaller gravitational acceleration, the following must be set up $$g = g_0(1 + h_1) \qquad \text{"horizontal"}$$

$$g_0(1 + h_2) = g \frac{1 + h_2}{1 + h_1} = g(1 + e) \qquad \text{calibration "inclined"}$$

and $g(1 + h_x) = g \frac{1 + h_x}{1 + h_1} = g(1 + x) \qquad \text{operation}$

If at first $$a'g = a$$

$$b'g = b$$

are assumed for simplification, we obtain for the six calibration values:

$$R_1 = B\,br$$

$$R_2 = B + br(1 + e)$$

$$N_1 = A + an$$

$$N_2 = A + an(1 + e)$$

$$S_1 = as$$

$$S_2 = as(1 + e)$$

and the two measurement values $$M = A + a(n + m) \cdot (1 + x)$$

$$R = B + br(1 + x)$$

The absolute and relative differences can be formed from the values determined in the calibration:

$$\Delta N = N_2 - N_1 = a \cdot ne$$
$$\frac{\Delta N}{N_1} = \frac{ane}{A + a \cdot n}$$

further $$\Delta R = R_2 - R_1 = bre$$
$$\frac{\Delta R}{R_1} = \frac{bre}{B + br}$$

and $$\Delta S = ase$$
$$\frac{\Delta S}{S_1} = \frac{ase}{as} = e$$

From this the computer forms the values based on the relative difference to the reference $$P = \frac{\Delta N}{N_1} \bigg/ \frac{\Delta R}{R_1} = \frac{ane(B + br)}{(A + an)bre} = \frac{an(B + br)}{br(A + an)}$$

and $$Q = \frac{\Delta S}{S_1} \bigg/ \frac{\Delta R}{R_1} = \frac{e(B + br)}{bre} = \frac{B + br}{br}$$

Both P and Q are independent of e; thus they are also independent of g, $g_0$, $a_1$, $a_2$.

If $$\frac{M - A}{R - B} = \frac{a(n + m)}{br}$$

is formed from the two measurement equations, the parameter $h_x$ can be read from the expression $(1 + x)$ and now the following equation system is obtained:

$$R_1 = B + br \quad (7)$$

$$N_2 = A + an \quad (8)$$

$$S_1 = an \quad (9)$$

$$P = \frac{an(B + br)}{br(A + an)} = \frac{anR_1}{brN_1} \quad (10)$$

$$Q = \frac{B + br}{br} = \frac{K_1}{br} \quad (11)$$

$$\frac{M - A}{R - B} = \frac{a(n + m)}{br} \quad (12)$$

In this the following are known:
a priori: s
by measurement: $R_1$, $N_1$, $S_1$, R, M
by calculation: P, Q
and the following are unknown:
the mass-independent initial load A,B
the mass-dependent initial load br
the zero-load mass n
and its conversion factor a
the sought mass m Of these, only m as the sought value is of interest; the remaining five values are required for the determination of m only within the scope of the calculation shown here. The calculation of the sought mass value m is performed in computer 4 with the stored values s, $R_1$, $S_1$, $N_1$, P, Q and the values M and R resulting from the actual weighing. The calculation performed here serves only for explanation of the evaluation formula which is depicted further below as equation (20).

$$a = S_1/s \quad (13)$$

follows directly from (9) just as $$br = R_1/Q \quad (14)$$

follows from (11).
By inserting this in (7), this yields $$B = R_1 - br = R_1\left(1 - \frac{1}{Q}\right); B = R_1\left(\frac{Q - 1}{Q}\right) \quad (15)$$

If $$an = PbrN_1/R_1 \quad (16)$$

is obtained from (10) and with consideration of (8)

$$an = \frac{PR_1N_1}{R_1Q} = N_1\frac{P}{Q} \quad (17)$$

by solving (8) for A, it is transformed into:

$$A = N_1 - an$$
$$= N_1 - N_1\frac{P}{Q}$$

this yields $$A = N_1Q - P/Q \quad (18)$$

Insertion of (13) in (17) yields $$n = N_1 \cdot \frac{P \cdot s}{QS_1} \quad (19)$$

From this, $$\frac{M - N_1 \cdot \frac{Q-P}{Q}}{R - R_1 \cdot \frac{Q-1}{Q}} = \frac{S \cdot \left(M + N_1 \cdot \frac{s}{S_1} \cdot \frac{P}{Q}\right) \cdot Q}{sR_1}$$

from which $$m = \frac{sR_1}{S \cdot Q} \cdot \frac{M - N_1 \cdot \frac{Q-P}{Q}}{R - R_1 \cdot \frac{Q-1}{+}Q} - \frac{sPN_1}{S_1Q}$$

or $$m = \frac{s}{S_1Q}\left\{R_1 \frac{M - N_1\frac{Q-P}{Q}}{R - R_1\frac{Q-1}{Q}} - PN_1\right\} \quad (20)$$

are obtained.

In addition to the usual elements for completion of the mathematical tasks and the required operating memory, computer 4 contains a PROM or EPROM as read-only memory for storage of the four mentioned values $R_1$, $N_1$, $S_1$, s determined during calibration and the values P and Q formed from this. Independence of the memory from the power supply is provided for this memory element.

We claim:

1. Balance for true measurement of mass in which the weight of the material being weighed is compared with the weight of a reference mass, said balance being calibrated by the manufacturer and able to calculate the mass of the material being weighed correctly without recalibration when the gravitational acceleration g deviates from the normal values and vertical acceleration is present, in this case both an angular deviation and vertical acceleration depending on their influence may amount to large fractions of the gravitational acceleration g, characterized by the fact that two independent dynamometers (2,3) are mounted with elastic initial load on a base plate (1), one of which, dynamometer (2), determines the weight of the material being weighed, and the other, dynamometer (3), determines the weight of a reference mass (8, 22,24), each dynamometer (2,3) exhibits a load sensor (19), which converts the compressive or tensile force acting on it into an electric signal, each dynamometer (2,3) exhibits a parallel guide (26), and the two dynamometers are mounted on the base plate (1) in such manner that the degrees of freedom of the two parallel guides (26) are parallel to each other and with a horizontal balance agrees with the direction of gravitational acceleration g, the two dynamometers (2,3) exhibit linear characteristic line, a computer (4) is present for mathematical processing of electric signals provided by the dynamometers (2,3) and for receipt of external control commands, each of the two dynamometers (2,3) exhibits a stop for limitation of the load-stipulated path.

2. Balance according to patent claim 1, characterized by the fact that the dynamometers (2,3) exhibit mechanical means to linearize the characteristic lines.

3. Balance according to patent claim 1, characterized by the fact that the computer (4) exhibits means to linearize the characteristic lines of dynamometers (2,3).

4. Balance according to patent claim 2 or 3, characterized by the fact that at least one of the load sensors (19) is designed so that the force acting upon it is converted into a digital electric signal.

5. Balance according to patent claim 2 or 3, characterized by the fact that at least one of the load sensors (19) is designed so that the force acting upon it is converted into an analog electric signal.

6. Balance according to patent claim 5, characterized by the fact that the computer (4) contains means to convert the analog electric signal into a corresponding digital signal.

7. Balance according to patent claim 5, characterized by the fact that both load sensors (19) are of the same type.

8. Balance according to patent claim 5, characterized by the fact that the two load sensors are of different type.

9. Balance according to patent claim 6, characterized by the fact that both load sensors (19) are of the same type.

10. Balance according to patent claim 6, characterized by the fact that both load sensors are of different type.

11. Balance according to patent claim 2 or 3, characterized by the fact that the computer (4) exhibits a read-only memory for permanent storage of the values determined in the calibration.

12. Process for calibrating and operating a balance according to patent claim 11, characterized by the fact that in the calibration, on the one hand with horizontal balance and on the other hand with a balance inclined at an angle, the following values determined by dynamometers (2,3), from which computer (4) forms the values $S_1 = M_1 - N_1$ and $S_2 = M_2 - N_2$, are stored in the read-only memory: the values $N_1$, $N_2$ by dynamometer (2) and the values $R_1$, $R_2$ by dynamometer (3) with empty balance pan (18) and the values $M_1$, $M_2$ by dynamometer (2) at full load produced by a calibration weight of value s; that further the relative differences of these values, i.e.

$$\frac{S_2 - S_1}{S_1} \quad \frac{R_2 - R_1}{R_1} \quad \frac{N_2 - N_1}{N_1}$$

are formed and are processed to $$P = \frac{N_2 - N_1}{N_1} \bigg/ \frac{R_2 - R_1}{R_1}$$

$$Q = \frac{S_2 - S_1}{S_1} \bigg/ \frac{R_2 - R_1}{R_1}$$

after which values N, R and S are cleared, that further the true mass value 3 of the calibration weight is input into the computer so that after calibration the following values are stored in the read-only memory of the computer (4); s, $R_1$, $N_1$, $S_1$, P and Q, that, in the weighing of an unknown mass under unknown angular deviation and acceleration conditions, the measurement value M of dynamometer (2) and the measurement value R of dynamometer (3) are received and processed using the mentioned stored values yielding the weighing result for the unknown mass according to the formula $$m = \frac{s}{S_1 Q} \left\{ R_1 \frac{M - N_1 \frac{Q - P}{Q}}{R - R_1 \frac{Q - 1}{Q}} - P \cdot N_1 \right\}.$$

* * * * *